(12) United States Patent
Park

(10) Patent No.: US 9,322,422 B2
(45) Date of Patent: Apr. 26, 2016

(54) FASTENER WITH DRILL PILOT AND REVERSED THREADED REGIONS

(71) Applicant: Simpson Strong-Tie Company, Inc., Pleasanton, CA (US)

(72) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 13/948,737

(22) Filed: Jul. 23, 2013

(65) Prior Publication Data

US 2014/0023455 A1    Jan. 23, 2014

Related U.S. Application Data

(60) Provisional application No. 61/674,746, filed on Jul. 23, 2012.

(51) Int. Cl.
*F16B 25/10* (2006.01)
*F16B 25/00* (2006.01)

(52) U.S. Cl.
CPC ........... *F16B 25/103* (2013.01); *F16B 25/0015* (2013.01); *F16B 25/0057* (2013.01); *F16B 25/0084* (2013.01)

(58) Field of Classification Search
CPC ........... F16B 25/00015; F16B 25/0068; F16B 2033/025; F16B 25/10; F16B 25/103; F16B 25/0057; F16B 25/0015
USPC ............ 411/412, 413, 387.1–387.8
See application file for complete search history.

(56) References Cited

U.S. PATENT DOCUMENTS

| 470,804 | A | | 3/1892 | Jones |
| 867,552 | A | | 10/1907 | Bradford et al. |
| 2,263,137 | A | | 11/1941 | Oestereicher |
| 3,478,639 | A | | 11/1969 | Gruca |
| 3,682,507 | A | | 8/1972 | Waud |
| 4,016,795 | A | * | 4/1977 | Gill ............................ 411/387.8 |
| 4,541,270 | A | | 9/1985 | Hanslik |
| 4,653,244 | A | | 3/1987 | Farrell |
| 4,834,602 | A | | 5/1989 | Takasaki |
| 4,874,278 | A | * | 10/1989 | Kawashita ................... 411/386 |
| 4,878,793 | A | | 11/1989 | Hewison |

(Continued)

FOREIGN PATENT DOCUMENTS

| AU | 494077 | 10/1977 |
| DE | 29621922 U | 4/1998 |

(Continued)

OTHER PUBLICATIONS

DIBT, Approval communication for Reg. No. Z-9.1-564, Jul. 1, 2008.

(Continued)

*Primary Examiner* — Gary Estremsky
(74) *Attorney, Agent, or Firm* — Vierra Magen Marcus LLP

(57) ABSTRACT

A fastener includes a shank having a pilot section and a threaded section. The pilot section includes a cutting tip and a drill section; the threaded section includes a first thread region having the same twist as the drill section and a reverse thread region. A helical ridge may be provided in the reverse thread region. A head at the second end includes a top portion such as a disk and an undercut region.

20 Claims, 3 Drawing Sheets

(56) References Cited

U.S. PATENT DOCUMENTS

| | | | |
|---|---|---|---|
| 5,015,134 A | 5/1991 | Gotoh | |
| 5,046,905 A * | 9/1991 | Piacenti | F16B 25/0031 408/224 |
| 5,171,186 A * | 12/1992 | Lukes | B21H 3/027 411/387.8 |
| 5,209,753 A | 5/1993 | Biedermann et al. | |
| 5,509,370 A | 4/1996 | Kovacs et al. | |
| 5,516,248 A | 5/1996 | DeHaitre | |
| 5,536,127 A | 7/1996 | Pennig | |
| 5,551,818 A * | 9/1996 | Koppel | F16B 19/083 411/29 |
| 5,897,280 A | 4/1999 | Dicke | |
| 5,987,837 A | 11/1999 | Nelson | |
| 6,000,892 A | 12/1999 | Takasaki | |
| 6,050,765 A | 4/2000 | McGovern et al. | |
| 6,086,303 A | 7/2000 | Fluckiger | |
| 6,109,850 A | 8/2000 | Commins | |
| 6,142,719 A * | 11/2000 | Daubinger | F16B 25/0021 411/387.1 |
| 6,227,430 B1 | 5/2001 | Rosen et al. | |
| 6,250,866 B1 * | 6/2001 | Devine | F16B 25/0026 411/387.4 |
| 6,328,516 B1 | 12/2001 | Hettich | |
| 6,398,785 B2 * | 6/2002 | Carchidi et al. | 606/916 |
| 6,616,391 B1 | 9/2003 | Druschel | |
| 6,666,638 B2 | 12/2003 | Craven | |
| 6,698,987 B1 * | 3/2004 | Dicke | 411/387.6 |
| 6,854,942 B1 | 2/2005 | Hargis | |
| 6,941,635 B2 | 9/2005 | Craven | |
| 7,037,059 B2 | 5/2006 | Dicke | |
| 7,090,453 B2 | 8/2006 | Lin | |
| 7,293,947 B2 | 11/2007 | Craven | |
| 7,402,016 B2 | 7/2008 | Yin-Feng | |
| 2003/0026675 A1 | 2/2003 | McGovern et al. | |
| 2003/0231941 A1 * | 12/2003 | Kenny | 411/411 |
| 2004/0141827 A1 | 7/2004 | Dicke | |
| 2004/0197139 A1 | 10/2004 | McGovern et al. | |
| 2006/0269380 A1 | 11/2006 | Yin-Feng | |
| 2007/0055236 A1 | 3/2007 | Hudgins et al. | |
| 2007/0128001 A1 | 6/2007 | Su | |
| 2007/0224019 A1 | 9/2007 | Hale | |
| 2008/0080951 A1 * | 4/2008 | Lin | 411/387.6 |
| 2009/0112269 A1 | 4/2009 | Lieberman et al. | |
| 2009/0162165 A1 * | 6/2009 | Chen | 411/412 |
| 2011/0217145 A1 * | 9/2011 | Kochheiser et al. | 411/412 |
| 2011/0280684 A1 * | 11/2011 | Lai | 411/387.7 |
| 2012/0294693 A1 * | 11/2012 | Gonciarz et al. | 411/387.1 |

FOREIGN PATENT DOCUMENTS

| | | |
|---|---|---|
| DE | 19846993 A1 | 4/2000 |
| DE | 202004011145 U1 | 9/2004 |
| DE | 202005006493 U1 | 6/2005 |
| DE | 202010016409 U | 2/2011 |
| EP | 1411252 A2 | 4/2004 |
| EP | 2092995 A2 | 8/2009 |
| EP | 2289647 A1 | 3/2011 |
| JP | 2002349528 A | 12/2002 |
| WO | 93/23680 | 11/1993 |

OTHER PUBLICATIONS

International Search report and Written Opinion dated Oct. 2, 2013, in International Appl. No. PCT/US2013/051704 filed Jul. 23, 2013.
International Preliminary Report on Patentability mailed Feb. 5, 2015, in International Patent Appl. No. PCT/US2013/051704 filed Jul. 23, 2013.
International Search report and Written Opinion dated Jul. 1, 2014, in International Appl. No. PCT/US2014/031324 filed Mar. 20, 2014.
Amendment dated Apr. 2, 2014, in U.S. Appl. No. 12/142,082, filed Jun. 19, 2008.

* cited by examiner

FASTENER WITH DRILL PILOT AND REVERSED THREADED REGIONS

CLAIM OF PRIORITY

This application claims priority to U.S. Provisional Patent Application No. 61/674,746, entitled "FASTENER WITH DRILL PILOT AND REVERSED THREADED REGIONS" filed Jul. 23, 2012, incorporated herein by reference its entirety.

BACKGROUND

Variations in fastener design have been used to improve different characteristics and performance of fasteners depending on the intended use of the fastener. In general, a screw-type fastener includes a threaded shank with a pointed tip at one end thereof and a head at the other end. The head has a recess for accepting a driver tip.

Fastener design can vary based on whether the design is used as a self-drilling fastener, or used with a pre-drilled bore, and based on the type of material for which the fastener is to be used.

SUMMARY

Technology is described herein which comprises a fastener having features allowing securing elements in wood, composite or other material and providing an improved counter-sunk head. The fastener includes a shank having a pilot section and a threaded section. The pilot section includes a cutting tip and a drill section; the threaded section includes a first thread region having the same twist as the drill section and a reverse thread region. A head at the second end includes a top portion such as a disk and an undercut region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
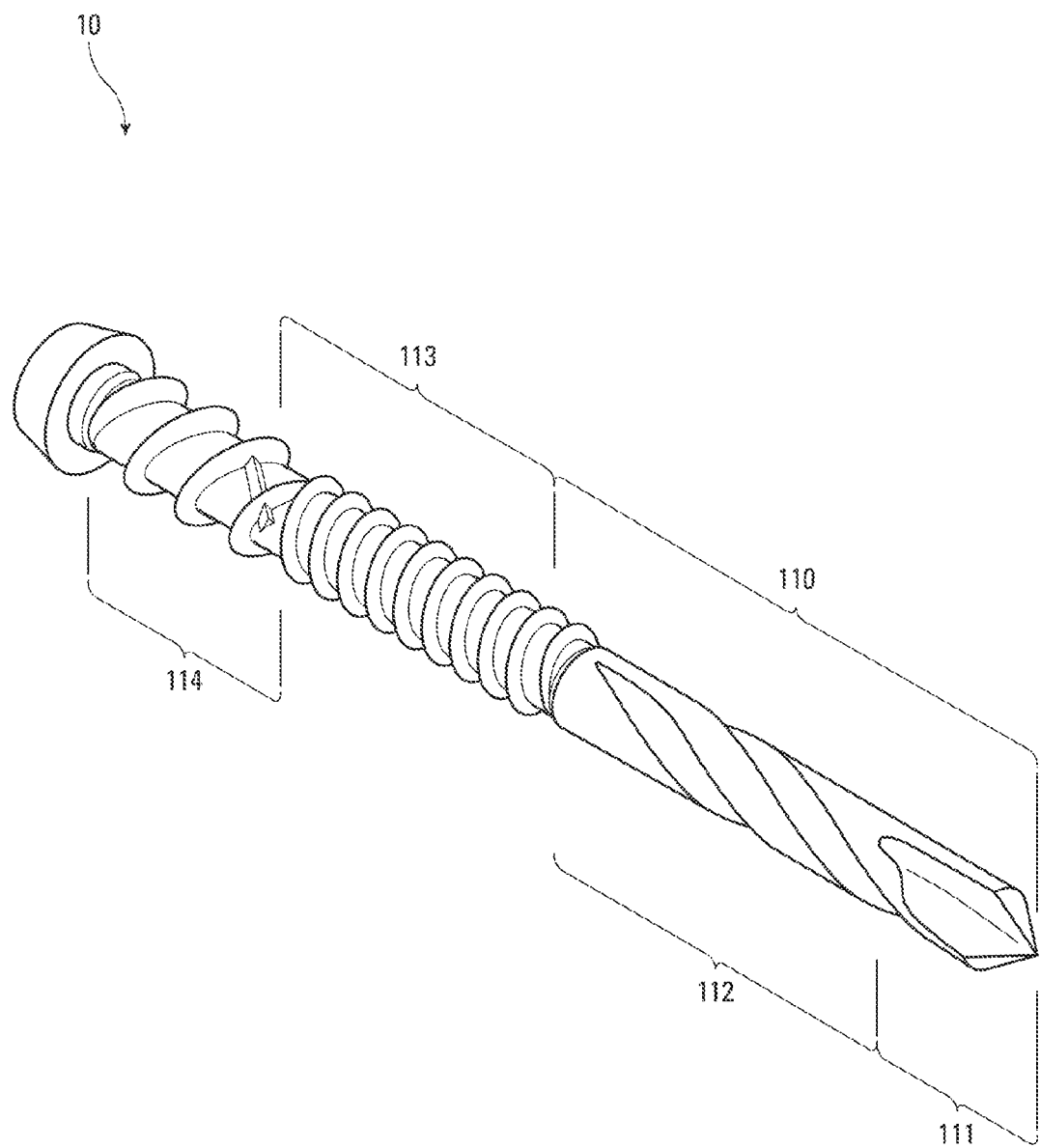
FIG. 1 depicts a perspective view of a first embodiment of a fastener in accordance with the present technology.
Figure 2:
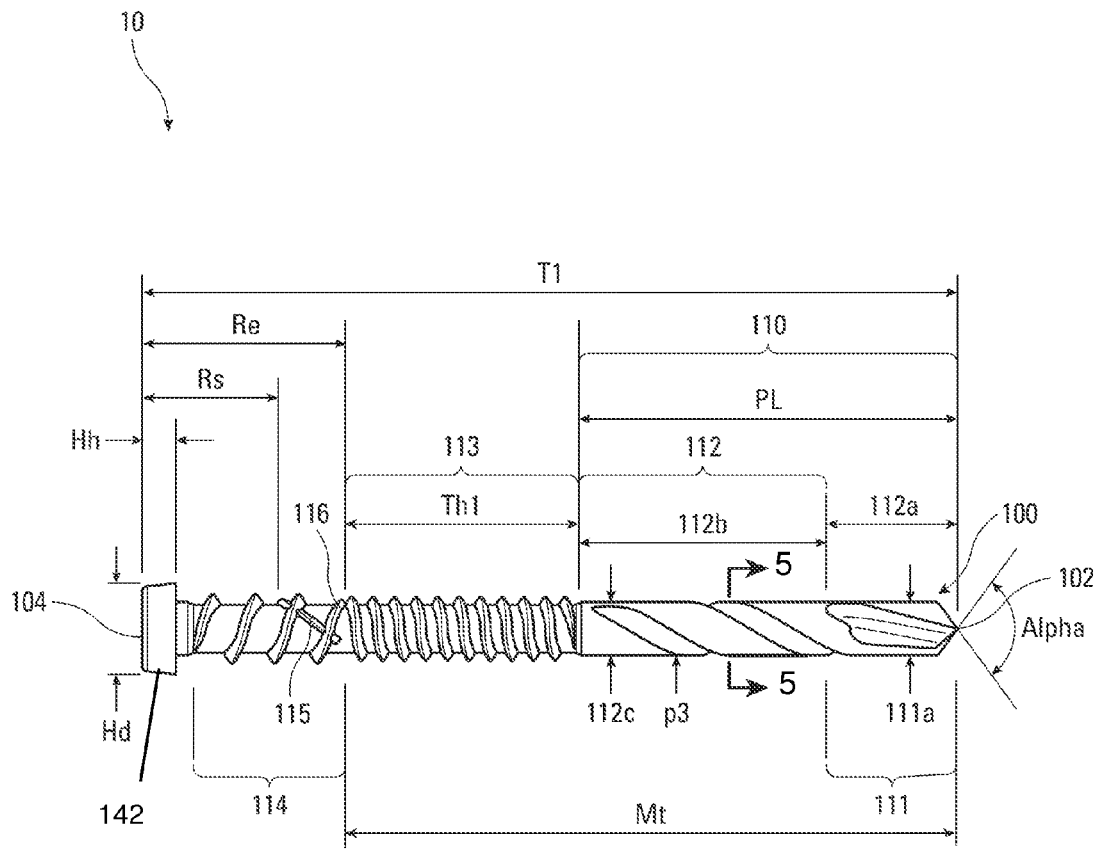
FIG. 2 depicts a plan view of a first embodiment of a fastener in accordance with the present technology.
Figure 3:
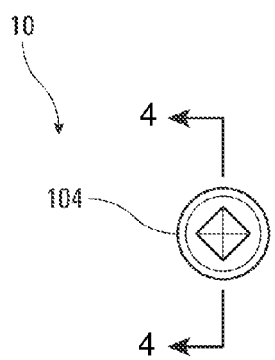
FIG. 3 depicts an end view of a first embodiment of a fastener in accordance with the present technology.
Figure 4:
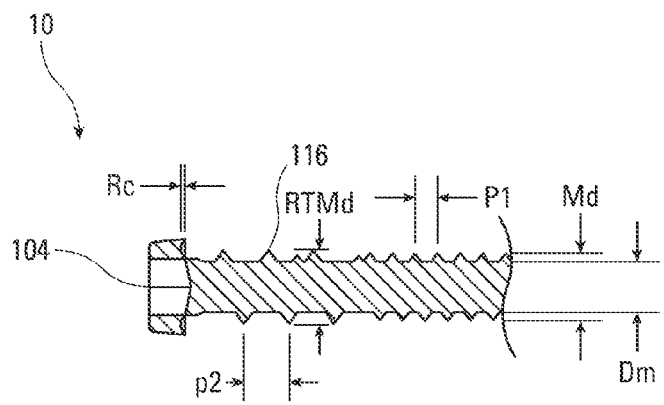
FIG. 4 depicts a partial cross sectional view along line 4-4 in FIG. 3.

The technology described herein is a fastener having features allowing for securing elements in wood, composite or other material and providing an improved counter-sunk head. The fastener is advantageously used in composite materials and in applications using the composite materials mounted to a steel frame. One example of this type of application is construction of a composite deck using a steel frame.

A first embodiment of the fastener technology will be described with respect to FIGS. 1-6.

The fastener 10 includes a pilot section 110 having a cutting tip 111 and a drill section 112, followed by a first threaded section having a twist matching the twist or spiral of the drill section, and a reverse thread section. The design of the fastener allows the fastener to bore into a material, such as a composite decking material, and bore through and engage a metal frame supporting the material, to secure the material to the frame. The pilot section ensures the fastener passes through both the composite and the metal material, and the threaded section engages the metal frame to secure the material to the frame. The threaded section pulls the fastener down by rotation of the fastener so that a head of the fastener engages and sinks into the material and secures the material to the frame. The reverse thread section evacuates debris generated by the boring of the fastener into the material as the fastener rotates into the material.

The fastener 10 of FIGS. 1-6 includes a shank 100 having a first end with a pointed tip 102 at and a second end having a head 104. The shank may be formed of galvanized steel. The body of the shank has a minor diameter Dm. A pilot region 110 of the shank includes a cutting tip 111 and a drill section 112 formed on the shank 100 and has a pilot length PL. The pilot region extends from pointed tip 102 to a threaded region 113. The shank in the first region has major diameter Md.

The cutting tip 111 is commonly known in the industry as a drill point tip, also referred to by a common manufacturer name as a TEK® point. A cutting tip has two cutting edges extending from the point 102 and formed from a cylindrical cross-section of a shank, ending in drill section 112. The cutting edges are symmetrical relative to the cross section and allow material borne out by the rotation of the screw to be evacuated as the fastener is rotated into the material. The cutting tip 111 has a point diameter 111a and a length 112a. The point is formed by an angle ALPHA of the cutting edges. The drill section 112 has a drill length 112b. As indicated in the Figures, the diameter 112c of the drill section 112 may be smaller than the diameter 111a of the drill point 102.

Figure 5:
FIG. 5 is a cross sectional view along line 5-5 in FIG. 2.
Figure 6:
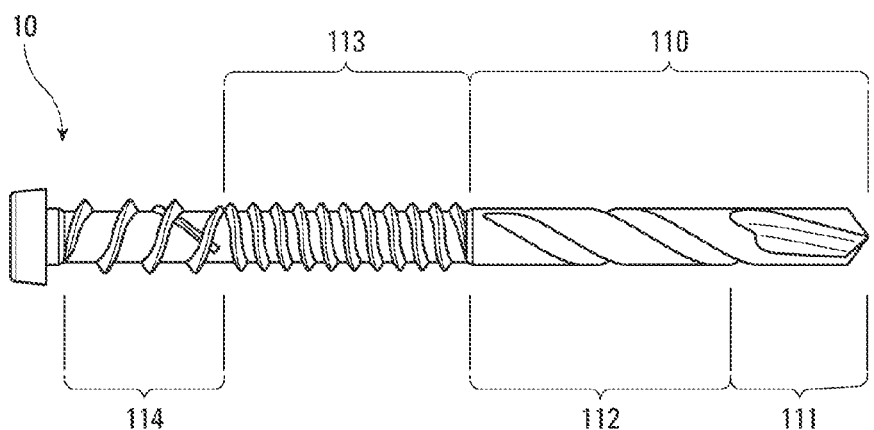
FIG. 6 is a plan view of the fastener in accordance with the present technology.

The drill section 112 has an effective diameter 112c with a drill spiral or flute having approximately one and a half turns in the drill section 112. More or fewer turns can be provided within the context of the technology. As illustrated in FIG. 5, a cross section along line 5-5 in FIG. 2, the spiral may be a double sided spiral (with two flutes effectively 180 degrees apart in section 112 (relative to the cross sectional diameter shown in FIG. 5)).

The drill section 112 abuts a first threaded region 113 having a thread with a twist direction matching the twist direction of the spiral in the drill section 112. A reverse thread section 114 abuts the first thread region between the region 113 and the head 104. The reverse thread region 114 includes a helical ridge 115 formed on the shank having an thread height lower than a thread height of the thread 116 in the reverse thread region 114, and of a shorter thread length (smaller number of turns) interspersed with the reverse thread 116 in reverse thread region 114.

The fastener has a total length T1 from the top of the head to the point 102. The head height is Hh and the helical ridge begins a distance Rs from the top of the head 104 and ends a distance Re from the top of the head. The first thread region has a length Th1.

The shank in the first thread region has a minor diameter Dm and a major diameter Md, the difference between which is the thread height of the threads in thread region 113. The threads in region 113 have a pitch P1, while those in the reverse thread region have a pitch P2. The reverse thread major diameter RTMd is greater than the major diameter Md and the difference between RTMd and minor diameter Dm is the height of the threads in region 114. The helical ridge has a height lower than the height of the threads in region 114.

In one embodiment, a reverse thread region need not be utilized.

The fastener has a total length T1. Region 113 has a length Th1. The head has a height Hh.

In one embodiment, the relationship between the aforementioned dimensions includes one or more of the following:

a. P2 is greater than P1 such that P2:P1 is in a range of about 1.7:1 to 2:1;

b. P3 is greater than P1 such that P3:P1 is in a range of about 20:1-30:1. In a fastener having a total overall length of about 2.375 inch, P3 will be approximately 0.75 turns per inch, with P1 being slightly less than half the length of the T1;

c. Md is greater than the diameter of the point 111a in a range of about 1.5:1-1.2:1;

d. RTMd is greater than Md in a range of about 1.15:1-1.02:1;

e. RTMd is greater than Dm in a range of about 1.55:1-1.3:1;

f. The diameter 111a of the cutting tip is greater than or equal to the diameter 112c of the drill section in a ratio of about 1:1 to 1.2:1; and g. Alpha is about 100-120 degrees and may be 105-115 degrees, but could be greater or smaller.

h. The relative length of section 110 (PL) to the length of 114 is about 2.5:1, and the relative length of section 113 (TH1) to 114 is about 1.8:1. Length 112a of tip 111 is about 20-30% of the length P1 of section 110.

A head 104 having a head diameter HD is provided at the other end of the shank 100. The head comprises a top portion which may include a disk 142 having a top surface and a bottom surface. The bottom surface is formed with a recess having a depth Rc In another embodiment (not shown), the top portion of the head includes no disk but terminates in a top surface. The top surface of the head is formed to have a recess forming a Phillips socket. Note that instead of the Phillips recess, a square or other shaped recess may be formed in the top of the head 142 to receive a driver.

The head diameter Hd is greater than the minor diameter Dm in a range of about 2.1:1 to 1.8:1.

The screw is designed to be a self-boring screw into the material to be fastened. However, a pilot hole may be utilized.

When the screw is driven into a material, the cutting tip and drill section bore out material as the screw is pressed and rotated (using for example a power drilling tool) into a material. Because the cutting tip has a slightly larger effective diameter, it is responsible for more of the torque and evacuation of material. Where the fastener is used in an application for fastening a first material (such as a composite) to a second, harder material (such as metal), the first threaded region does not generally contribute to pull down in the first material. Rather, when the first threaded region reaches the harder material, the first threaded region engages the harder material and provides pull down as the screw rotates. The reverse thread region evacuates material as the screw rotates in the first material.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
a shank having a first end and a second end, and having a diameter, the shank including
a pilot region beginning at the first end and including a drill section having a drill diameter formed by a surface, the surface having a flute formed in the surface, the flute forming at least one turn about a circumference of the surface along a length of the pilot region;
a first thread region adjacent the pilot region having a thread with a twist direction matching a twist direction of the drill section;
wherein the pilot region extends from the first end to the first thread region and has a point diameter adjacent to the first end, the drill diameter being less than the point diameter, the point diameter comprising a diameter of a bore formed by the fastener when the fastener is rotated into a substrate;
a reverse thread region adjacent the first thread region, the reverse thread region having a thread having a twist opposite to the thread in the first thread region; and
a head at the second end.

2. The fastener of claim 1 wherein the pilot region includes a cutting tip including first and second cutting edges and the drill section.

3. The fastener of claim 2 wherein the cutting tip comprises a drill point tip, the flute occupying the pilot region between the cutting tip and the first thread region.

4. The fastener of claim 3 wherein the cutting tip includes a pointed end, the pointed end formed by two cutting edges joined at an angle between 100 and 120 degrees.

5. The fastener of claim 2 wherein the cutting tip has a diameter and the drill section has a diameter smaller than the diameter of the cutting tip.

6. The fastener of claim 5 wherein the thread in the first thread region is a helical thread having a height defining a diameter greater than a diameter of the cutting tip in a range of about 1.5:1-1.2:1.

7. The fastener of claim 2 wherein the pilot region drill section has a helical twist having a pitch greater than a pitch of the thread in the first thread region.

8. The fastener of claim 2 wherein the cutting tip has a length which is about 20-30% of a length of the pilot region.

9. The fastener of claim 1 further including a helical ridge in the reverse thread region having a twist direction matching the thread in the first thread region.

10. The fastener of claim 9 wherein the helical ridge has a height which is less than a height of the thread in the reverse thread region.

11. The fastener of claim 1 wherein the thread in the reverse thread region includes a height which is greater than a minor diameter of the shank in the first thread region in a range of about 1.55:1-1.3:1.

12. The fastener of claim 1 wherein the pilot region has a length which is greater than a length of the reverse thread region by about 2.5:1.

13. The fastener of claim 1 wherein the first thread region has a length which is greater than a length of the reverse thread region, by about 1.8:1.

14. The fastener of claim 1 wherein a pitch of the thread in the reverse thread region is greater than a pitch of the thread in the first thread region in a range of about 1.7:1 to 2:1.

15. A fastener, comprising:
a shaft having a first end and a head at a second end, the shaft including a pilot region including a cutting tip adjacent to the first end and a drill section positioned extending from the cutting tip, the drill section having a drill diameter formed by a surface, the drill diameter being less than a diameter formed by edges of the cutting tip, the diameter of the cutting tip adapted to create a bore with a matching diameter when the fastener is rotated into a substrate, the drill section including a flute spiraled at least one turn within the drill section and into the surface of the drill section;

a first thread region adjacent to the pilot region having a helical thread with a twist direction matching a twist direction of the flute, the helical thread having a diameter greater than the drill diameter of the drill section;

a reverse thread region adjacent the pilot region, the reverse thread region having a thread with a twist direction opposite the thread in the first thread region, the thread in the reverse thread region having a diameter greater than the diameter of the helical thread; and the head having a top portion and a bottom portion the bottom portion having a recess.

16. The fastener of claim 15 wherein the flute has a helical twist having a pitch greater than a pitch the thread in the first thread region.

17. The fastener of claim 16 wherein the helical thread in the first thread region has a height greater than the diameter of the cutting tip in a range of about 1.5:1-1.2:1.

18. The fastener of claim 17 further including a helical ridge in the reverse thread region having a twist direction matching the thread in the first thread region, the helical ridge has a height which is less than a height of the thread in the reverse thread region.

19. A fastener having a first end and a second end, comprising:

a pilot region including a cutting tip adjacent to the first end and a drill section positioned adjacent to the cutting tip, the cutting tip having a diameter larger than a diameter of the drill section formed by a surface of the drill section, the drill section including a flute forming at least one turn in the drill section, the flute spiraled in and below the surface of the drill section, the diameter of the cutting tip adapted to create a bore with a matching diameter when the fastener is rotated into a substrate;

a first thread region adjacent to the pilot region having a helical thread with a twist direction matching a twist direction of the flute, the helical thread having a diameter greater than the diameter of the drill section.

20. The fastener of claim 19 further including a reverse thread region adjacent the pilot region, the reverse thread region having a thread with a twist direction opposite the thread in the first thread region, the thread in the reverse thread region having a diameter greater than the diameter of the helical thread.

* * * * *